United States Patent [19]

Kintz

[11] Patent Number: 5,306,742
[45] Date of Patent: Apr. 26, 1994

[54] SB203/SB205 FLAME RETARDANT DISPERSIONS

[75] Inventor: Donald P. Kintz, Westford, Mass.

[73] Assignee: Nyacol Products Inc., Ashland, Mass.

[21] Appl. No.: 813,458

[22] Filed: Dec. 26, 1991

[51] Int. Cl.$^5$ ................................................ C08K 9/02
[52] U.S. Cl. .................................. 523/200; 524/409;
428/403; 423/617; 252/610; 252/611
[58] Field of Search ............... 523/200; 524/409;
428/403; 423/617; 252/610, 611

[56] References Cited

U.S. PATENT DOCUMENTS

| | | | |
|---|---|---|---|
| 3,113,118 | 12/1963 | Canterino et al. | 524/409 |
| 3,300,423 | 1/1967 | Brown et al. | 524/409 |
| 3,718,584 | 2/1973 | Beste et al. | 524/409 |
| 4,123,398 | 10/1978 | Unrau et al. | 524/409 |
| 5,008,036 | 4/1991 | Crompton et al. | 252/313.1 |
| 5,182,048 | 1/1993 | Kintz et al. | 252/363.5 |

Primary Examiner—Paul R. Michl
Assistant Examiner—John J. Guarriello
Attorney, Agent, or Firm—Alvin Isaacs

[57] ABSTRACT

Disclosed are novel antimony oxide flame retardant dispersions containing trivalent antimony deposited on the surface of antimony pentoxide particles, which compositions are particularly useful for providing flame retardancy to fiberglass products.

13 Claims, No Drawings

SB203/SB205 FLAME RETARDANT DISPERSIONS

BACKGROUND OF THE INVENTION

It is known to include antimony trioxide dispersions in various polyester and vinyl ester resins to provide flame retardancy properties to fiberglass or other articles containing the resins.

Nyacol Products Inc., assignee of the present application manufactures and sells a flame retardant additive, "NYACOL" APE1540, which is a dispersion of colloidal antimony pentoxide particles in a liquid isophthalic polyester resin. It can be substituted for the more common antimony trioxide in flame retardant resins containing bromine or chlorine to provide certain advantages over the trioxide. In this context, NYACOL APE1540 could aptly be called a quality control enhancer because the fine particles are nearly invisible, allowing in-process and final inspection with the same degree of confidence as non-flame retardant laminates, as distinguished from the trioxide which results in opaque laminates. Other advantages over antimony trioxide include ease of handling and incorporation in the resin component for the product to be protected, better penetration into the structure because the particles are not filtered by the fiberglass, and the fact that it is more chemically resistant than the trioxide.

While antimony pentoxide flame retardant additives such as described above provide distinct advantages over antimony trioxide in commercial applications for providing flame retardant properties to the article in which it is incorporated, to a greater or lesser extent it alters the cure characteristics of unsaturated polyesters and may provide less than optimum results.

Accordingly, the task of the present invention may be stated to be to provide antimony pentoxide in a usable form for polyesters, i.e. so that it will not alter the cure characteristics to provide the final product or otherwise adversely effect the quality of the product in which it is incorporated to provide flame retardant properties.

BRIEF DESCRIPTION OF THE INVENTION

In accordance with this invention, the antimony pentoxide is provided for preparation of the flame retardant resin dispersion as an aqueous sol having trivalent antimony deposited on the surface of the antimony pentoxide particles. While the exact mechanism by which the antimony is deposited on the surface of the antimony pentoxide is not clear, what is clear is that the chemistry of the pentoxide is not the same, as will be discussed in detail hereinafter.

DETAILED DESCRIPTION OF THE INVENTION

As previously mentioned, the present invention is directed to novel antimony oxide flame retardant additives. Since it is particularly directed to the use of such additives to provide flame retardant properties to fiberglass articles, it will be discussed hereinafter with reference thereto.

To better comprehend the task of this invention, brief reference may be had to an illustrative preparation of fiberglass composite products, which preparation per se is old and comprises no part of the present invention.

A typical process for preparing fiberglass laminates or composites utilizes an open mold having a polished inner surface. A composition comprising at least a liquid polyester vehicle, a cross-linking initiator, e.g. a peroxide initiator, a metallic cross-linking promoter, e.g. a cobalt compound, and a thickening agent and optionally other adjuvants providing specific desired properties, e.g. a colorant, is deposited in the mold to provide an outer layer for the laminate. The resulting coating is allowed to cure at room temperature until the cure reaches a stage of partial cure known as the "gel state". At this point of the process an impregnating composition consisting essentially of a polyester, cross-linking initiator and cross-linking promoter, as heretofore described along with a flame retardant is applied over the first or gel coat. The impregnating composition, unlike the gel coat will contain no thickening agent or colorant. Immediately thereafter, and before any substantial curing of the impregnating composition can occur, fiberglass is layered in the mold over the impregnating composition. A process known as "wet-out" is then performed wherein a worker employs a ribbed roller to be sure any air entrained in the interstices of the layered fiberglass is removed and the fiberglass is rolled out until completely saturated with the impregnating composition. Additional alternate layers or plies of impregnating composition and fiberglass are then applied until the laminate reaches the particular desired thickness, which may for example be as small as 1/32 inch to on the order of two inches. As the layering continues and the cure proceeds, an exotherm builds up until the final exotherm of, say, 300° F. After a holding period until the cure is complete, the laminate may then be removed from the mold.

As heretofore alluded to, with certain resins in the impregnating solution, notably certain vinyl esters, the addition of antimony pentoxide flame retardants such as the aforementioned NYACOL APE1540 flame retardant dispersion tends to adversely affect the cure to a varying extent, depending upon the resin employed. The adverse effect, which can range from minor to the point of little consequence to significant deficiencies in the fiberglass composite, is manifested by such defects as deformation, sagging under stress, etc. While not limited to any particular theory, the adverse effect on cure rate is believed to be due, at least in part, to the antimony pentoxide deactivating the metallic promoter for curing.

For this reason, the task of this invention, as heretofore stated, is to supply antimony pentoxide flame retardant in usable form for incorporation in unsaturated polyesters for preparing fiberglass composite products without altering or impairing the cure characteristics of the polyester to form the desired fiberglass product.

As was alluded to earlier, in accordance with this invention the task is solved by providing, as the flame retardant additive, trivalent antimony deposited on the surface of a colloidal dispersion of antimony pentoxide particles in a liquid polymeric vehicle. The amount of the antimony oxide present in the dispersion may be up to about 55 pph (expressed as 100% antimony pentoxide) with on the order of 40 pph (parts per hundred) being preferred.

Suitable polymeric materials which may be employed as the organic liquid vehicle for the colloidal flame retardant dispersion include isophthalic esters, epoxy or acrylic resins, polysulfones, polyurethanes, etc. As is well known in the art, the liquid vehicle may contain bromide or chloride substituents to increase the flame retardant property over that obtained by the antimony oxide alone.

The novel additives of this invention may be prepared simply by the steps of:

(1) heating a mixture of antimony pentoxide water sol and antimony trioxide while maintaining the water content of the mixture at a temperature and for a time (e.g. 85°-95° C. for at least 4 hours) to cause an interaction of the oxides wherein trivalent antimony is deposited on the surface of the antimony pentoxide;

(2) subjecting the above antimony oxide sol and a mixture of the organic vehicle and a coupling agent to moderate sheer mixing until the solids all transferred from the aqueous into the organic phase;

(3) removing free water from the mixture, e.g. by decanting;

(4) evaporating off substantially all entrained water to a final water content of less than 0.5%; and, optionally, as needed (5) adding additional organic vehicle to lower the percentage of antimony oxide in the resulting colloidal dispersion.

The colloidal flame retardant additive as prepared above may then be incorporated in the impregnating composition to form the fiberglass composite containing the desired effective amount of flame retardant, e.g. to provide an E-84 class 1 flame spread having on the order of 0.8 to 4.0% by weight antimony oxide (expressed as 100% antimony pentoxide).

In the foregoing process for preparing the antimony oxide of this invention, the ratio by weight of the antimony trioxide to the antimony pentoxide may be on the order of from about 2:10 to about 4:10 with a particularly useful ratio being on the order of about 3.5:10. The antimony pentoxide particles may range in size from about 0.15 u to about 0.65 u. As heretofore mentioned, up to about 55 pph of the antimony oxide (expressed as 100% pentoxide) may be present in the dispersion with about 40 pph being preferred.

The following example shows by way of illustration the preparation of the flame retardant additives of this invention:

EXAMPLE 1

To 8000 ml of 9.04% antimony pentoxide aqueous sol (containing 786.84 gms of $Sb_2O_5$) were added 275.4 gms of antimony trioxide. The resulting mixture was heated to 85°-95° C. for in excess of 24 hours while maintaining the water content of the mixture to cause an interaction of the oxides so that the trivalent antimony is deposited as a coating on the surface of the pentoxide. 1258.33 gms of the above sol (having 150 gms of antimony oxide expressed as 100% antimony pentoxide) were exposed to moderate sheer conditions by mixing 7ith a three-blade propeller at a temperature of about 35° C. 154.17 gms of low molecular weight unsaturated propylene glycol isophthalic ester having a viscosity between 250-1000 cps at 30° C. having dissolved therein 8.7 gms of "Triton" RW 20 (Rohm & Haas), an ethylene oxide branched chain aliphatic tertiary amine coupling agent were rapidly added to the antimony oxide sol with continued mixing. The mixing was continued until the solids transferred into the organic (ester) phase, as evidenced by coagulation into a viscous mass. The water phase was decanted and the remaining entrained water (about 12-18%) was evaporated by heating with mixing to provide a water content of less than 0.5%. The percentage of antimony oxide in the resulting sol, expressed as 100% antimony pentoxide, was about 51% by weight. Additional ester was added to bring the percentage of antimony oxide by weight down to about 40%.

As heretofore mentioned, the flame retardant additive prepared above may be incorporated in the impregnating composition for preparing fiberglass composites to provide an amount of antimony oxide expressed as 100% antimony pentoxide of on the order of from about 0.8 to about 4.0% by weight of the impregnating composition. In other words, in the practice of this invention as applied to providing flame retardant properties to fiberglass laminates, the dispersion of illustrative Example 1 will be employed in the impregnating composition as previously described along with the cross-linking activator and promoter.

In the following comparative example, a vinyl ester containing the novel flame retardant of Example 1 was compared with a control vinyl ester impregnating composition having no antimony oxide flame retardant and one containing the aforementioned commercially available APE1540. For proper controls, the three test compositions were otherwise essentially the same.

EXAMPLE 2

Impregnating compositions of "Derakane" 510 A-40 (Dow Chemical), a typical vinyl ester for preparing fiberglass composites, with no additive, with APE1540, and with the additive prepared in Example 1 were compared for gel time, the time for gelling to reach pK and the pK temperature. The test results are as follows:

|  | Gel Time | Gel → pK | pK temp. (°F.) |
| --- | --- | --- | --- |
| Control (no additive) | 17.5 | 20.0 | 307 |
| NYACOL APE1540 | 36.0 | 40.5 | 290 |
| Test Composition | 19.0 | 27.0 | 305 |

Apart from the longer gel time, the pK temperature of 290° F. for the antimony pentoxide dispersion, APE 1540 indicates that the cure is being suppressed. As distinguished therefrom, the test compound of this invention compares closely with the control having no additive.

While, as heretofore mentioned, the exact reaction mechanism by which the antimony from the antimony trioxide is deposited on the antimony pentoxide is not known, it is clear, as evidenced from the comparative data of Example 2, that the chemistry of the pentoxide is changed. It is clear that the pentoxide no longer has the same surface chemistry, as evidenced by the fact that, unlike antimony pentoxide, e.g. as contained in APE1540, the antimony oxide sol of this invention does not deactivate metallic promoters such as cobalt and thereby prevent proper cure of the laminate.

Since certain changes may be made without departing from the scope of the invention herein contemplated, it is intended that all matter contained in the foregoing description, including the Examples, be taken as illustrative and not in a limiting sense.

What is claimed is:

1. An antimony oxide flame retardant comprising trivalent antimony deposited on the surface of a colloidal dispersion of antimony pentoxide particles.

2. A flame retardant as defined in claim 1 wherein the colloidal dispersion of antimony pentoxide particles having trivalent antimony deposited on the surface is in a liquid polymeric vehicle.

3. A flame retardant as defined in claim 2 wherein the amount of antimony oxide present in the dispersion is no greater than about 55 parts per hundred expressed as 100 percent antimony pentoxide.

4. A flame retardant as defined in claim 2 wherein the antimony oxide in the dispersion is on the order of about 40 parts per hundred expressed as 100 percent antimony pentoxide.

5. A flame retardant as defined in claim 2 wherein the liquid polymeric vehicle is selected from the group consisting of isophthalic esters, epoxy resins, acrylic resins, polysulfones and polyurethanes.

6. A flame retardant as defined in claim 3 wherein the liquid polymeric vehicle comprises an isophthalic ester.

7. In an article of manufacture containing an antimony oxide flame retardant additive, the improvement wherein the additive comprises a flame retardant comprising trivalent antimony deposited on the surface of a colloidal dispersion of antimony pentoxide particles in a liquid polymeric vehicle.

8. An article of manufacture as defined in claim 7 wherein the article of manufacture is a fiberglass composite.

9. An article of manufacture as defined in claim 8 wherein the antimony oxide present in the dispersion is no greater than about 55 parts per hundred expressed as 100 percent antimony pentoxide.

10. An article of manufacture as defined in claim 9 wherein the liquid polymeric vehicle comprises an isophthalic ester.

11. The method of preparing an antimony oxide flame retardant additive comprising the steps of:
   (1) heating a mixture of antimony pentoxide water sol and antimony trioxide while maintaining the water content of the mixture to cause an interaction of the oxides wherein trivalent antimony is deposited as a coating on the surface of the antimony pentoxide particles;
   (2) mixing the antimony oxide sol prepared in step (1) with a liquid organic vehicle and stirring the resulting mixture until the antimony oxide particles having trivalent antimony on the surface are transferred from the aqueous phase to the organic phase of the liquid vehicle;
   (3) separating free water from the mixture prepared in step (3); and
   (4) evaporating off from the mixture substantially all entrained water.

12. The method as defined in claim 11 wherein the evaporation of entrained water is continued to a final water content of less than about 0.5 percent by weight.

13. An antimony oxide flame retardant additive prepared by the process as defined in claim 12.

* * * * *